United States Patent [19]
Mistopoulos

[11] Patent Number: 5,143,760
[45] Date of Patent: Sep. 1, 1992

[54] EXTRUDED MOLDING WITH DESIRED CONTOURED FORMATION

[75] Inventor: James E. Mistopoulos, Dearborn Heights, Mich.

[73] Assignee: The Standard Products Company, Cleveland, Ohio

[21] Appl. No.: 544,337

[22] Filed: Jun. 27, 1990

[51] Int. Cl.⁵ .............................. B60R 13/04
[52] U.S. Cl. ...................... 428/31; 156/244.17; 156/244.18; 156/273.9; 293/128
[58] Field of Search ............ 428/31; 156/244.17, 156/244.18, 273.9; 293/128

[56] References Cited

U.S. PATENT DOCUMENTS

| | | | |
|---|---|---|---|
| 2,570,935 | 10/1946 | Freedlander | 264/22 X |
| 3,491,186 | 1/1970 | Rainar | 264/295 |
| 3,711,360 | 1/1973 | Kent | 428/31 X |
| 3,982,780 | 9/1976 | Keith | 428/31 X |
| 4,064,206 | 12/1977 | Seufert | 264/295 X |
| 4,364,789 | 12/1982 | Moran | 428/31 X |
| 4,397,896 | 8/1983 | Moran | 428/31 |
| 4,412,960 | 11/1983 | Goldman et al. | 264/22 |
| 4,786,094 | 11/1988 | Barton et al. | 293/128 |
| 4,830,892 | 5/1989 | Nussbaum | 428/31 |

Primary Examiner—Henry F. Epstein
Attorney, Agent, or Firm—Harness, Dickey & Pierce

[57] ABSTRACT

A molding for attachment to an automotive vehicle includes an extrusion member extending longitudinally. An insert is attached to the extrusion member and is adapted to be connected to a source of electrical power to heat the insert and extrusion member in a local area to form the local area to predetermined contour.

12 Claims, 1 Drawing Sheet

EXTRUDED MOLDING WITH DESIRED CONTOURED FORMATION

BACKGROUND OF THE INVENTION

1. Field of the Invention

The present invention relates generally to moldings for automotive vehicles, and more particularly to, an extrusion molding formed locally to a desired design contour for an automotive vehicle.

2. Description of Related Art

Molding for automotive vehicles are commonly used, for example, as body side moldings to protect the sides of vehicles from nicks, scatches and dents, of the type inflicted in parking lots by the careless. Moldings are also used as fascia trim and can serve aesthetic purposes to enhance the lines of the vehicle. The trim moldings are generally extruded from a plastic material such as vinyl.

One disadvantage of the above moldings is that they are typically formed as straight sections. This does not allow the moldings to accurately follow an arcuate contour. Another disadvantage is that arcuately shaped moldings are generally formed by conventional injection molding. This results in additional time and expense to form arcuate moldings as opposed to straight or linear moldings.

SUMMARY OF THE INVENTION

It is, therefore, one object of the present invention to provide a molding with a desired or predetermined contour for an automotive vehicle.

It is another object of the present invention to provide a molding which can be formed locally to a desired design contour.

It is yet another object of the present invention to provide an arcuately shaped molding which is formed in less time and with less expense than by conventional injection molding.

To achieve the foregoing objects, the present invention is a molding for attachment to a side of an automotive vehicle. The molding includes an extrusion member extending longitudinally and an insert attached to the extrusion member and is adapted to be connected to a source of electrical power to heat the insert in a local area to form the local area to predetermined contour.

The present invention is also a method of making a molding for attachment to an automotive vehicle. The method includes the steps of forming an extrusion member to extend longitudinally and attaching an insert to the extrusion member. The method further includes connecting the insert to a source of electrical power, heating the insert and a local area of the extrusion member, and forming the local area of the extrusion member to a predetermined contour.

One advantage of the present invention is that the molding is extruded as a straight section and formed locally to a desired design contour. Another advantage of the present invention is that conventional injection molding is eliminated to form arcuately shaped moldings. A further advantage of the present invention is that less time and expense is involved in forming a molding to an arcuate shape or desired contour.

Other objects, features and advantages of the present invention will be readily appreciated as the same becomes better understood by reading the following description in light of the accompanying drawings.

DESCRIPTION OF THE PREFERRED EMBODIMENTS

Figures 1A, 1B:
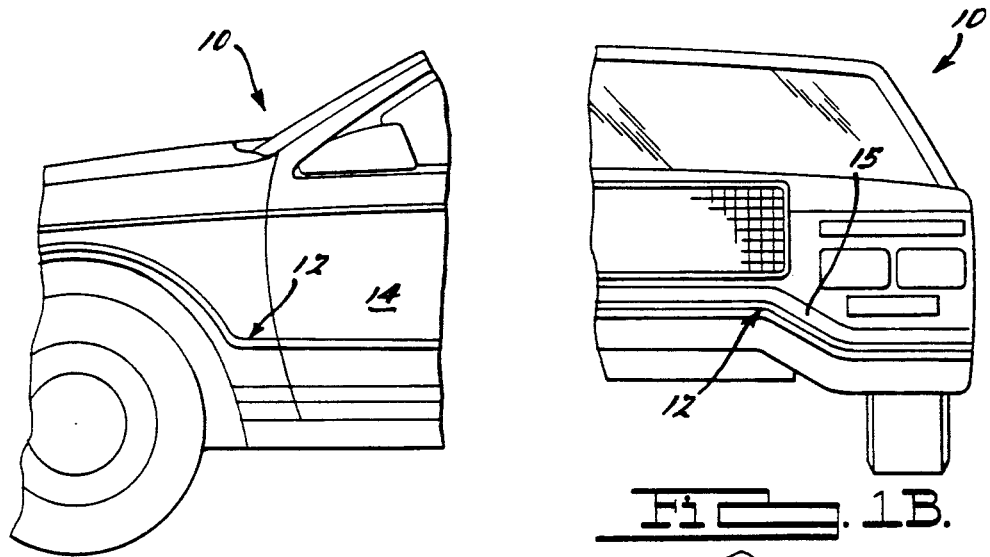
FIG. 1A is a side elevation view of a portion of an automotive vehicle incorporating a molding according to the present invention.
FIG. 1B is a front elevation view of an automotive vehicle incorporating a molding according to the present invention.

Referring to FIGS. 1A and 1B, an automotive vehicle 10 including a molding 12 according to the present invention is shown. As illustrated in FIG. 1A, the molding 12 is a trim or body side molding secured to the outer surface 14 of fender and/or door panels of the automotive vehicle 10 generally in the position shown. Although the molding 12 has been illustrated as a protective body side molding for the vehicle, it will be appreciated that the present invention can be employed in molding strips for other purposes. For example, the molding 12 may be used as an insert for a bumper 15 as illustrated in FIG. 1B.

Figure 2:
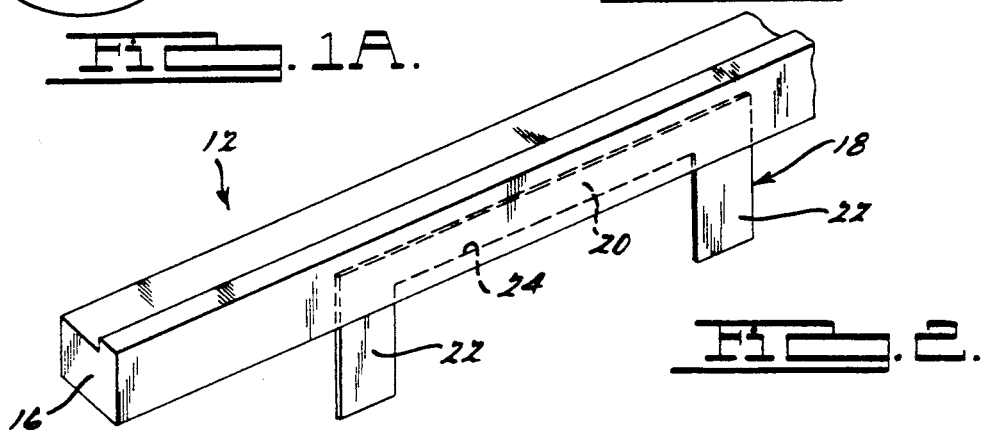
FIG. 2 is a perspective view of the molding of FIG. 1 prior to formation.
Figure 3:
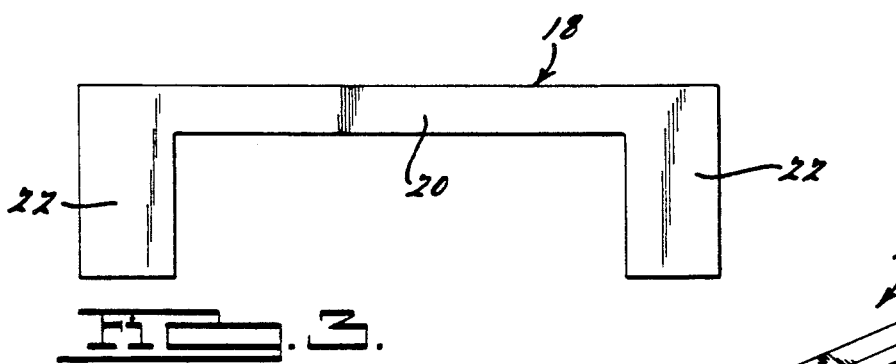
FIG. 3 is a front view of an insert for the molding of FIGS. 1 and 2.

Referring to FIGS. 2 and 3, the molding 12 includes an extrusion member 16 which extends generally longitudinally in a plane. Preferably, the extrusion member 16 is made of a polyvinyl plastic material such as a flexible polyvinyl chloride material. The molding 12 also includes an insert, generally indicated at 18. Preferably, the insert 18 is made of a metal material such as aluminum having a thickness to allow the insert 18 to be flexible. The insert 18 has a horizontal portion 20 with tabs 22 at each end extending outwardly substantially perpendicular to the horizontal portion 20. The horizontal portion 20 is disposed in a groove or slit 24 formed in one side of the extrusion member 16 and extending longitudinally partially therealong. The slit 24 is formed with a steel rule die when the extrusion member 16 is in the straight formation to allow the insert 18 to be placed in the extrusion member 16. A material such as a vinyl primer is applied to both sides of the insert 18 prior to inserting the insert 18 into the slit 24 of the extrusion member 16.

Figure 4:
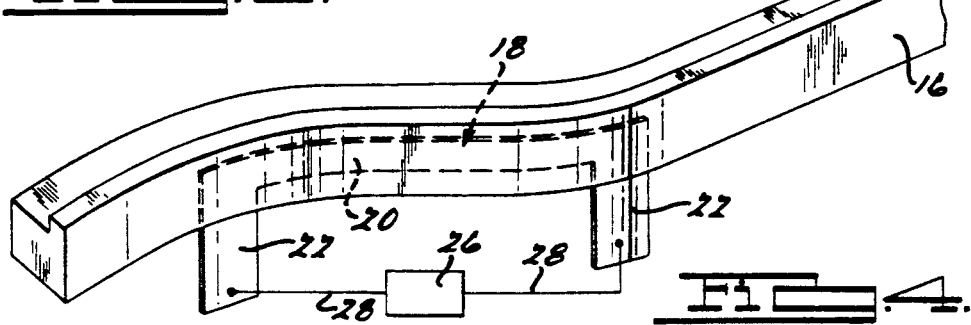
FIG. 4 is a perspective view of the molding of FIG. 2 after formation.

In operation, referring to FIG. 4, a power source 26 having electrodes 28 are electrically connected to the tabs 22 at both ends of the insert 18. Electrical current flows from the power source 26 and through the electrodes 28 and insert 18. The insert 18 acts as a resistor and conducts heat. This limits the melting point temperature of the vinyl material for the extrusion member 16 to the bonding surfaces of the insert 18. The insert 18 heats up and activates chemical bonding between the insert 18 and extrusion member 16 due to the adhesive action of the vinyl primer. The heated extrusion member 16 is pliable in the area of the insert 18. As a result, the extrusion member 16 may be formed or shaped locally in the heated area of the insert 18 to a desired or predetermined contour using a fixture apparatus (not shown) to hold its desired contour position. After bonding of the insert 18 to the extrusion member 16, the molding 12 is cooled to room temperature prior to removing the contoured molding 10 from the contoured fixture. The tabs 22 are then removed from the insert 18 by means such as cutting.

A method of making a contoured molding according to the present invention is also provided. The method includes forming an extrusion member 16 as a straight or linear member and forming a slit 24 in the extrusion member 16 with a steel rule die in the portion that will have a local contour. The method also includes applying a vinyl primer to both sides of the insert 18 and placing or disposing the insert 18 into the slit 24 of the straight extrusion member 16 as illustrated in FIG. 2. The method further includes applying electricity from a power source 26 to the tabs 22 and heating the isert 18. The method includes bonding the insert 18 to the extrusion member 16 and heating the extrusion member 16 until pliable. The method also includes forming the straight extrusion member 16 locally to the desired contour using a fixture apparatus to hold its desired contour position. The method includes cooling the molding 12 and removing the tabs 22.

Accordingly, the present invention allows a vinyl extrusion to be formed locally to a desired design contour by heating the stamped aluminum insert (with vinyl primer on both sides) with electricity by using the insert as a resistor. The extruded vinyl section holds its desired contour position, resulting in no surface color distortion, no mylar crazing and no material delamination.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A molding for attachment to an automotive vehicle, comprising:
   an extrusion member extending longitudinally and having a longitudinally extending groove; and
   a flexible, electrically conductive insert in only a local area of said extrusion, said insert having a longitudinal length disposed in said groove, each end of said length having a tab extending laterally therefrom and adapted to be connected to a source of electrical power to heat said insert and extrusion member in said local area to facilitate forming the local area to a predetermined contour.

2. A molding as set forth in claim 1 wherein said insert is made of a metal material.

3. A molding as set forth in claim 2 wherein said insert is made of aluminum.

4. A molding as set forth in claim 1 wherein said extrusion member is made of a plastic material.

5. A molding as set forth in claim 4 wherein said extrusion member is made of a flexible polyvinyl chloride material.

6. A molding as set forth in claim 1 wherein a vinyl primer is applied to both sides of said insert prior to being disposed in said slit.

7. A molding for attachment to an automotive vehicle, comprising:
   an extrusion member extending longitudinally including means forming a slit therein and extending partially therealong; and
   a metallic insert having a horizontal portion adapted to be disposed in said slit and a tab extending outwardly substantially perpendicular from each end of said horizontal portion and adapted to be connected to a source of electrical power to heat said insert and said extrusion member in a local area to form the local area to a predetermined contour.

8. A method of making a molding for attachment to an automotive vehicle, said method comprising the steps of:
   forming an extrusion member to extend longitudinally;
   forming a longitudinally extending slit in a local area of said extrusion member;
   attaching an electrically conductive flexible insert to the extrusion member in said slit;
   connecting the insert to a source of electrical power;
   heating the insert and said local area of the extrusion member; and
   forming the local area of the extrusion member to a predetermined contour.

9. A method as set forth in claim 8 wherein said insert is made of metal material.

10. A method as set forth in claim 9 including the step of applying a primer to both sides of the insert and disposing the insert in the slit.

11. A method as set forth in claim 9 wherein said metal material is aluminum.

12. A method as set forth in claim 11 wherein said extrusion member is made of a flexible polyvinylchloride material.

* * * * *